(12) United States Patent
Balko (10) Patent No.: US 10,182,257 B2
(45) Date of Patent: Jan. 15, 2019

(54) CLIENT-SIDE VIDEO TRANSCODING AND PROCESSING

(71) Applicant: CLIPCHAMP IP PTY LTD, Enoggera QLD (AU)

(72) Inventor: Soeren Balko, Indooroopilly (AU)

(73) Assignee: CLIPCHAMP IP PTY LTD, Enoggera Qld (AU)

( * ) Notice: Subject to any disclaimer, the term of this patent is extended or adjusted under 35 U.S.C. 154(b) by 0 days.

(21) Appl. No.: 14/806,662

(22) Filed: Jul. 23, 2015

(65) Prior Publication Data

US 2016/0212482 A1    Jul. 21, 2016

Related U.S. Application Data

(60) Provisional application No. 62/031,168, filed on Jul. 31, 2014.

(51) Int. Cl.

| H04N 21/4402 | (2011.01) |
|---|---|
| H04N 21/432 | (2011.01) |
| H04N 21/422 | (2011.01) |
| H04N 21/4223 | (2011.01) |
| H04N 21/443 | (2011.01) |
| H04N 21/4782 | (2011.01) |
| H04N 21/81 | (2011.01) |

(Continued)

(52) U.S. Cl.
CPC . H04N 21/440218 (2013.01); H04N 21/4223 (2013.01); H04N 21/42203 (2013.01);
(Continued)

(58) Field of Classification Search
CPC ......... H04N 21/42203; H04N 21/4223; H04N 21/4325; H04N 21/4334; H04N 21/439;
(Continued)

(56) References Cited

U.S. PATENT DOCUMENTS

| 6,247,050 B1 * | 6/2001 | Tso ........................ H04L 29/06 |
|---|---|---|
| | | 709/203 |
| 6,772,200 B1 * | 8/2004 | Bakshi .............. G06F 17/30905 |
| | | 707/E17.121 |

(Continued)

*Primary Examiner* — Thai Q Tran
*Assistant Examiner* — Stephen R Smith
(74) *Attorney, Agent, or Firm* — Neugeboren O'Dowd PC (57) ABSTRACT

A client-side video transcoding and processing method for transcoding and processing of video or audio files on end-user client devices, such as desktop computers, laptops, tablet computers, smartphones, wearable devices, or any other end user computing device that can access a network such as the Internet and is equipped with a standard user agent software, such as a World Wide Web browser. The client-side video transcoding and processing generally includes an end user computing device 10, such as a workstation, personal computer, laptop, desktop computer, tablet computer, smartphone, wearable computing device or another suitable computing device, a server computer 20 that is connected to the end user computing device 10 through a network, such as the Internet, a user agent 30, which is a standard software platform such as a World Wide Web browser that is installed on the end user computing device 10, a user interface software component 40, which is part of the video transcoding or processing application and runs within the user agent 30 and a video conversion software component 50, which is part of the video transcoding or processing application and runs within the user agent 30.

21 Claims, 4 Drawing Sheets

(51) Int. Cl.
*H04N 21/439* (2011.01)
*H04N 21/433* (2011.01)

(52) U.S. Cl.
CPC ..... *H04N 21/4325* (2013.01); *H04N 21/4431* (2013.01); *H04N 21/440263* (2013.01); *H04N 21/440281* (2013.01); *H04N 21/4782* (2013.01); *H04N 21/8173* (2013.01); *H04N 21/439* (2013.01); *H04N 21/4334* (2013.01)

(58) Field of Classification Search
CPC ... H04N 21/440218; H04N 21/440263; H04N 21/440281; H04N 21/4431; H04N 21/4782; H04N 21/8173
USPC ......... 348/441; 386/230, 284, 353; 717/178; 709/217, 226; 707/756, 999.01; 715/234
See application file for complete search history.

(56) References Cited

U.S. PATENT DOCUMENTS

| | | | | |
|---|---|---|---|---|
| 8,688,665 | B2* | 4/2014 | Tirpak | H04L 65/605 707/705 |
| 9,361,298 | B2* | 6/2016 | Welts | G06F 17/30017 |
| 9,510,033 | B1* | 11/2016 | Corley | H04N 21/258 |
| 2006/0259588 | A1* | 11/2006 | Lerman | G06F 17/30017 709/219 |
| 2007/0083527 | A1* | 4/2007 | Wadler | G06F 17/30852 |
| 2011/0274155 | A1* | 11/2011 | Noh | H04N 21/23439 375/240.01 |
| 2012/0191876 | A1* | 7/2012 | Johnson | G06F 9/505 709/246 |
| 2012/0271948 | A1* | 10/2012 | Martin | H04N 21/2393 709/226 |
| 2013/0058634 | A1* | 3/2013 | Martinez Reol | G06F 9/5072 386/353 |
| 2014/0244488 | A1* | 8/2014 | Kim | G06Q 20/02 705/39 |
| 2015/0009403 | A1* | 1/2015 | Li | H04N 19/40 348/441 |
| 2015/0088934 | A1* | 3/2015 | Beckman | G06F 21/6227 707/781 |
| 2015/0244788 | A1* | 8/2015 | Fausak | H04L 67/1002 709/203 |
| 2015/0262174 | A1* | 9/2015 | Mongillo, III | G06Q 20/40 705/15 |
| 2016/0048485 | A1* | 2/2016 | Sherwood | G06F 17/2247 715/234 |

* cited by examiner

CLIENT-SIDE VIDEO TRANSCODING AND PROCESSING

CROSS-REFERENCE TO RELATED APPLICATIONS

This application claims the benefit of U.S. Provisional Application No. 62/031,168, filed 31 Jul. 2014.

BACKGROUND OF THE INVENTION

The present invention relates generally to browser-based video transcoding and more specifically it relates to a client-side video transcoding and processing method for transcoding and processing of video or audio files on end-user client devices, such as desktop computers, laptops, tablet computers, smartphones, wearable devices, or any other end user computing device that can access a network such as the Internet and is equipped with a standard user agent software, such as a World Wide Web browser.

BRIEF SUMMARY OF THE INVENTION

The invention generally relates to a browser-based video transcoding method which includes an end user computing device 10, such as a workstation, personal computer, laptop, desktop computer, tablet computer, smartphone, wearable computing device or another suitable computing device, a server computer 20 that is connected to the end user computing device 10 through a network, such as the Internet, a user agent 30, which is a standard software platform such as a World Wide Web browser that is installed on the end user computing device 10, a user interface software component 40, which is part of the video transcoding or processing application and runs within the user agent 30 and a video conversion software component 50, which is part of the video transcoding or processing application and runs within the user agent 30.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a Client-side Video Transcoding And Processing method for transcoding and processing of video or audio files on end-user client devices, such as desktop computers, laptops, tablet computers, smartphones, wearable devices, or any other end user computing device that can access a network such as the Internet and is equipped with a standard user agent software, such as a World Wide Web browser.

Another object is to provide a Client-side Video Transcoding And Processing method that can transcode a video or audio file, where one or a plurality of input audio or video files are converted into one or a plurality of output audio or video files that may differ in technical parameters of the video or audio file, such as the file format (e.g., APPLE QUICKTIME, WINDOWS MEDIA, MOTION PICTURE EXPERT GROUP MP4, GOOGLE WEBM and others), the video or audio encoding (e.g., MOTION PICTURE EXPERT GROUP H.264, GOOGLE VP8, MOTION PICTURE EXPERT GROUP AAC, and others), the video resolution (such as standard definition, high definition, ultra-high definition, etc.), the video and audio bitrate, and other settings affecting the quality, file size, compatibility with various output devices, etc.

Another object is to provide a Client-side Video Transcoding And Processing method that may run the transcoding or processing software directly on the end user client device, where the transcoding or processing software is transparently deployed on the end user client device, without performing manual installation steps, thus reducing the effort until the software can be used and enabling users to use the software, who cannot install software on their end user client devices, such as managed computing devices in a corporate environment.

Another object is to provide a Client-side Video Transcoding And Processing method that may transcode or process video or audio files residing on the end user client device, thus avoiding to transfer video or audio files to another computing device, such as a server, where the cost and timely delay of transferring a video or audio file is avoided.

Another object is to provide a Client-side Video Transcoding And Processing method that may perform further video or audio processing tasks on the end user client device, such as producing a summary video or audio file of one or a plurality of video or audio files, where the summary may be a shortened video or audio file, containing relevant portions of the input video or audio file.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a block diagram showing an architectural break-down of the invention into principal components, including an end user computing device 10, a server computer 20, a user agent 30, which is a standard software platform running on the end user computing device 10, a user interface component 40, which provides a human interaction and application programming interface for video transcoding or processing, and a video conversion component 50, which implements the algorithms for video transcoding and processing.

FIG. 2A and FIG. 2B depict a variation of the invention where the video transcoding and processing application code is compressed using a non-standard, advanced compression algorithm, such as the BURROWS-WHEELER (BZIP2) algorithm, the LEMPEL-ZIV-MARKOV CHAIN (LZMA) algorithm, the PAQ algorithms and others. Details of this variation of the invention are given further below.

FIG. 3 depicts a variation of the invention where the video transcoding and processing application code and any state of a video transcoding and processing application instance (such as completely transcoded and processed video files) are stored in the application cache 15 and the local storage device 14, respectively. Upon starting a video transcoding and processing application, the application cache 15 on the end user computing device 10 is looked up for already containing the video transcoding and processing application code. Likewise, the local storage device 14 is looked up for stored application state of a previous run of the video transcoding and processing application instance, which is recovered and passed to the new video transcoding and processing application instance. Details of this variation of the invention are given further below.

DETAILED DESCRIPTION OF THE INVENTION

A. Overview

Figure 1:
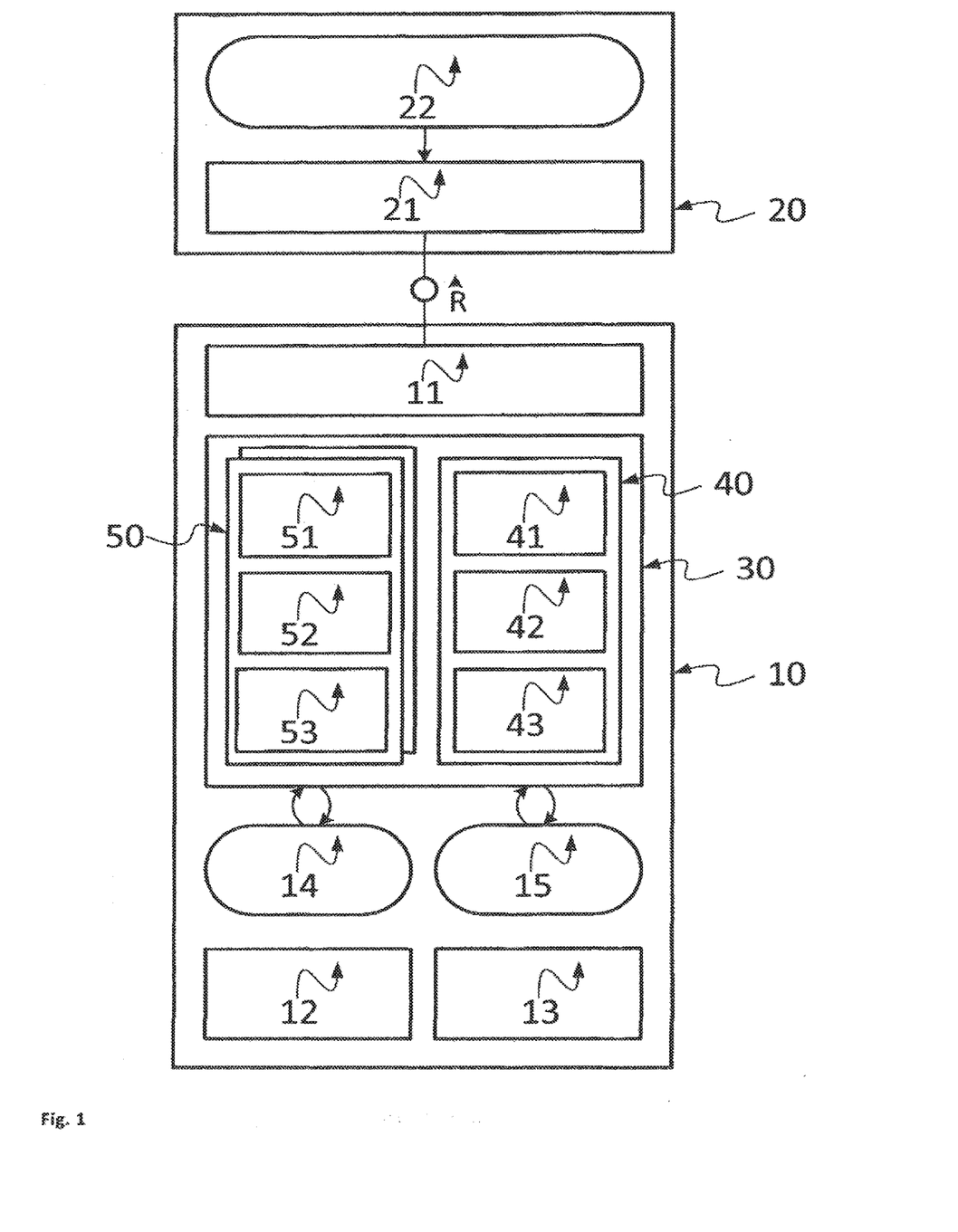
FIG. 1 is a block diagram illustrating the overall of the present invention.

Turning now descriptively to the drawings, in which similar reference characters denote similar elements throughout the several views, the figures illustrate an end user computing device 10, such as a workstation, personal computer, laptop, desktop computer, tablet computer, smartphone, wearable computing device or another suitable computing device, a server computer 20 that is connected to the end user computing device 10 through a network, such as the Internet, a user agent 30, which is a standard software platform such as a World Wide Web browser that is installed on the end user computing device 10, a user interface software component 40, which is part of the video transcoding or processing application and runs within the user agent 30 and a video conversion software component 50, which is part of the video transcoding or processing application and runs within the user agent 30.

B. End User Computing Device

The end user computing device 10 is a computing device suitable to perform general computing tasks, such as transcoding and processing video data, interacting with users through suitable user interaction devices such as display, touch screen, keyboard, mouse and others. The end user computing device may further include or provide connectivity to video capturing devices, such as digital cameras. An end user computing device contains a client network interface 11 to send and receive data from other computing devices, such as a server computer 20, other end user computing devices 10, accessories such as digital cameras and microphones and other electronic devices suitable to receive and send data that is relevant to the invention (such as video files, program code (software), user interface markup, configuration data, etc.). An end user computing device is further equipped with a central processing unit (CPU) 12 and may optionally have a graphics processing unit (GPU) 13, which are both integrated circuits suitable to process program code. The end user computing device 10 may further have a local storage device 14, which may be a transient or persistent data storage device (such as random access memory, solid state drives, hard drives, etc.) and an application cache 15, which is a temporary storage for program code, which was received from another computing device such as the server computer 20.

In the context of the invention, the end user computing device 10 is a programmable computing device, which can run arbitrary software (within the limitations imposed by the programming model of the platform provided by the user agent 30 and by resource limitations resulting from hardware characteristics of the end user computing device 10 as such) and which can connect to a computer network such as the Internet through a client network interface 11. The end user computing device must have a central processing unit (CPU) 12, which also includes field-programmable gate arrays (FPGA), an application-specific integrated circuit (ASIC) or another integrated circuit suitable to perform coded computer instructions, and a local storage device 14, which may be a random access memory (RAM), a hard disk drive (HDD), a solid state drive (SSD) or other devices suitable to transiently or permanently store data. The end user computing device may further contain a graphics processing unit (GPU) 13, which is an integrated circuit that is specialized in performing computationally intense graphics rendering operations, and an application cache 14, which is a storage device or service that may be used to temporarily store software applications that were received from an external computing device, such as a server computer 20.

Variants of the end user computing device include personal and professional computing devices, such as workstations, personal computers, laptop computers, tablet computers, smartphones, wearable computing devices, and other suitable computing devices, which may be able to run a video transcoding or processing application. In another embodiment of the invention, the end user computing device may be virtualized using software to emulate the behavior and characteristics of a hardware-based computing device.

C. Server Computer

The server computer 20 is a computing device that is connected to a network, such as the Internet, where it provides electronic services, such as delivering documents and applications to an end user computing device 10. The server computer may run a World Wide Web server, an application server, a file server or another type of server software suitable to send data such as program code, video files, etc. to an end-user computing device 10. The server computer 20 may have a server network interface 21, which is the communication endpoint for receiving and sending data from and to the end user computing device 10. The server computer 20 may further have a server storage device 22, where data is permanently stored. The data stored on the server storage device 22 may include program code, user interface markup, application configuration data and any other data that may be requested by an end user computing device 10.

The server computer 20 is a computing device that is communicatively coupled to the end user computing device 10 through a network such as the Internet. In the context of the invention, the role of the server computer 20 is to provide a centralized service that may be accessed by the end user computing device 10 to retrieve the video transcoding and processing software. For the purpose of fulfilling that role, the server computer 20 may have a server network interface 21, which is the communication endpoint for all interactions between the end user computing device 10 and the server computer 20. The server network interface 21 may both receive and send data from and to an end user computing device. The server computer 20 may further contain a server storage device 22, which permanently or transiently stores data, which may be requested by an end user computing device 10, such as a video transcoding and processing software.

In one embodiment of the invention, the server computer 20 may be a World Wide Web server, where the client network interface 11 sends hypertext transfer protocol (HTTP) network requests to the server network interface 21 of the server computer. The World Wide Web server may then respond to these requests by delivering a video transcoding and processing software, which is data representing a World Wide Web site, comprising hypertext markup language (HTML) files, JAVASCRIPT application code, cascading style sheet (CSS) files and other resources, to the end user computing device 10.

D. User Agent

The user agent 30 is a standard software platform that runs on an end user computing device 10. The user agent 30 provides for a runtime environment for program code to be executed on the end user computing device. The user agent 30 may further retrieve program code, user interface markup and other data from a server computer 20 or from the application cache 15 and may instantiate and run the received program code on the end user computing device 10. Examples of user agents include World Wide Web browsers, an ORACLE JAVA runtime environment, a MICROSOFT. NET runtime environment, an ADOBE AIR runtime environment and any other software that is suitable to receive and run software from an external source, such as a server computer 20. The user agent 30 may further provide a plurality of application programming interfaces (APIs) that can be invoked by the video transcoding and processing application. For a user agent 30 that is a World Wide Web browser, these APIs may be the set of WORLD WIDE WEB CONSORTIUM (W3C) HTML5 APIs, such as the DOCUMENT OBJECT MODEL (DOM) API, the INDEXED DATABASE API, and others.

The user agent 30 is a standard software platform, which can retrieve application software from another computer, such as a server computer 20. The user agent can further instantiate that software into a running software application, such as a video transcoding and processing application that comprises of a user interface component 40 and a video conversion component 50. The user agent 30 may further bundle capabilities of the end user computing device 10 and abstract from device-specific hardware characteristics by providing a standard application programming interface (API) to the video transcoding and processing application, such as the W3C HTML5 API.

In one embodiment of the invention, the user agent 30 may be a World Wide Web browser like GOOGLE CHROME, MOZILLA FIREFOX, APPLE SAFARI, MICROSOFT INTERNET EXPLORER, OPERA or another software capable of retrieving World Wide Web site data from another computer such as server computer 20, displaying the visual elements of the World Wide Web site (such as text, graphics, etc.) and running application code that is bundled or linked to the World Wide Web site, such as JAVASCRIPT code, GOOGLE PNACL code, GOOGLE DART code, ORACLE JAVA applet code, MICROSOFT SILVERLIGHT code, ADOBE FLASH code, MICROSOFT ACTIVEX code or any other common representations of application code in World Wide Web sites. In another embodiment of the invention, the user agent may be an ORACLE JAVA RUNTIME ENVIRONMENT, a MICROSOFT. NET runtime environment, an ADOBE AIR runtime environment or any other network-connected application container and runtime environment suitable to receive application code from another computer and running that application code on the end user computer device 10.

E. User Interface Component

The user interface component 40 is an element of the video transcoding and processing application running within the user agent 30, which is responsible to receive one or a plurality of video files, to capture parameters for video transcoding or processing from a user through a user interface (such as a graphical user interface, a text-based user interface, touch gestures, voice commands and other types of user interfaces suitable to provide parameters and for a video transcoding or processing application), to notify users of the status and progress of a video transcoding or processing task, and to give a user access to options for actions to perform with a completely transcoded or processed video, such as to save the video on the local storage device 14, to play back the video, to share the video on social networks, to pass the video to external services responsible for distributing the video, etc. Apart from direct end user interactions, the user interface component 40 may further offer an application programming interface (API), where a software component may perform the aforementioned operations of specifying an input video, setting video transcoding and processing parameters, receiving status information while the video transcoding or processing task is running, receiving the completely transcoded or processed video, and triggering actions on the completely transcoded or processed video, such as storing the video on the local storage device 14, or passing it to an external service, such as a social network.

The user interface component 40 is the part of the video transcoding and processing application performing all interactions with users and other technical components (software and hardware). The user interface comprises of an input interface component 41, which provides for the means to specify one or a plurality of input video files and video transcoding and processing parameters; a status interface component 42, which reports status information such as the progress of performing a certain video transcoding or processing task; and an output interface component 43, which provides for operations to be performed on completely processed or transcoded video files, such as to share the video on social networks, to play back the video, to save the video on the local storage device 14 or an external computing device that is connected through a network.

In one embodiment of the invention, the user interface component 40 may be the graphical user interface of a World Wide Web site, providing graphical controls (buttons, input fields, etc.) operated by keyboard commands, mouse clicks, and touch gestures. In another embodiment of the invention, the user interface component 40 may be operated by voice commands.

F. Video Conversion Component

The video conversion component 50 is an element of the video transcoding and processing application, which receives one or a plurality of video files and video transcoding and processing parameters from the user interface component 40, performs the transcoding and processing of the given video files, sends status information to the user interface component 40, and returns the completely transcoded or processed video files to the user interface component 40. The video transcoding and processing that is performed by the video conversion component 50 may be transcoding (decoding and encoding) of the video files from their source format to another target format, where the target format specifies the container format (such as APPLE QUICKTIME, WINDOWS MEDIA, MOTION PICTURE EXPERT GROUP MP4, GOOGLE WEBM, MATROSKA etc.), the video and audio codecs (such as MOTION PICTURE EXPERT GROUP H. 264 and H. 265, GOOGLE VP8 and VP9, MICROSOFT VC-1, FRAUNHOFER MP3, ADVANCED AUDIO CODING, XIPH. ORG FOUNDATION VORBIS, etc.), the video resolution (e. G., standard definition, high definition, ultra-high definition "4K", etc.), the video and audio bitrate, the video aspect ratio (e. G., 4:3, 16:9, 21:9, etc.), and other parameters of the output video files, affecting the quality, target device compatibility and other characteristics of the video file and the contained video, audio, and subtitle streams. The transcoding task may be performed by third-party and open-source software, such as FFMPEG.ORG FFMPEG, LIBAV.ORG TEAM LIBAV, MPLAYERHQ. HU MENCODER, VIDEOLAN.ORG X264, GOOGLE LIBVPX, and other suitable software packages, where the third-party or open-source software may be cross-compiled, re-packaged or otherwise altered to be compatible with the runtime environment of the user agent 30. The video conversion component 50 may further process video files by applying video and image processing algorithms on the given input video, including image upscaling and downscaling, where the size of the video frames is increased or reduced, respectively; increasing or decreasing the frame rate, where the number of video frames per second is increased or lowered. When increasing the frame rate, extra frames are inserted, where the video conversion component 50 computes the new frames using suitable algorithms. Other video processing algorithms may include different image and audio filters, such as image distortions, insertion of stereoscopic effects, color adjustments and others.

The video conversion component 50 is the part of the video transcoding and processing application, which receives one or a plurality of input video files and parameters from the user interface component 40, transcodes or processes the received input videos according to the parameters and produces status information, and returns the produced output videos to the user interface component 40. The video conversion component 50 contains a video transcoding component 51, which transcodes input videos into output videos, changing their container format, video and audio codecs, bitrate, video resolution, aspect ratio, and other technical parameters characterizing the quality, compatibility, size, etc. of the resulting output video files. The video conversion component 50 may further contain a video processing component 52, which is a software performing other video processing tasks, including video upscaling and downscaling, increasing and decreasing a video's frame rate, etc. The video conversion component 50 may also contain a native fallback component 53, which is a software wrapper around native video transcoding and processing capabilities that are available on the end user computing device 10. For example, some central processing units 12 or graphics processing units 13 provide dedicated hardware support for decoding or encoding videos.

In one embodiment, the video conversion component 50, which runs in the user agent 30 is a JAVASCRIPT software, which was cross-compiled from third-party or open-source software video transcoding and processing packages, such as FFMPEG, LIBAV, X264, MPLAYER, etc. In another embodiment of the invention, the video conversion component 50 is a software GOOGLE NATIVE CLIENT (NACL) or PORTABLE NATIVE CLIENT (PNACL) software, which was cross-compiled from existing third-party or open-source video transcoding and processing software packages. In another embodiment of the invention, the video conversion component 50 may be cross-compiled into any other suitable runtime format, including ADOBE FLASH, ORACLE JAVA, MICROSOFT SILVERLIGHT, MICROSOFT ACTIVEX and others. In another embodiment of the invention, the video conversion component 50 may be a from-scratch implementation of a video transcoding or processing software that is not cross-compiled from an existing third-party or open-source software. In another embodiment, the video conversion component 50 may be using the graphics processing unit 13 through suitable GPU programming interfaces, such as KHRONOS GROUP WEBGL, KHRONOS GROUP WEBCL, NVIDIA CUDA and others.

G. Connections of Main Elements and Sub-Elements of Invention

The end user computing device 10 may contain or be communicatively coupled to a client network interface 10, a central processing unit 12, a graphics processing unit 13, a local storage device 14, and an application cache 15. The end user computing device 10 may further run a user agent 30, which is a standard software platform, such as a World Wide Web browser. The client network interface 11 of the end user computing device 10 may be communicatively coupled to a server network interface 21, which is part of a server computer 20. The server computer 20 may further contain or be communicatively coupled to a server storage device 22, such as a hard disk drive, a solid state drive, random access memory or any other device suitable to transiently or permanently store data, including external software services, such as Cloud storage services such as DROPBOX, AMAZON S3, GOOGLE DRIVE, MICROSOFT ONEDRIVE and others. The user agent 30, which may be a World Wide Web browser, such as GOOGLE CHROME, MOZILLA FIREFOX, APPLE SAFARI, MICROSOFT INTERNET EXPLORER, or OPERA, provides the runtime environment and application container for the video transcoding and processing application with its principal components being a user interface component 40 and a video conversion component 50. The user interface component 40 may comprise of an input interface component 41, where the input video files and parameters for the video transcoding or processing applications are received, a status interface component 42, where status information about a running video transcoding or processing task are provided, and an output interface component 43, where the transcoded or processed output video files are provided. The user interface component 40 constitutes the entry point to the video transcoding and processing applications that is the sole interface for users and external applications to interact with the video transcoding and processing application. The user interface component 40 further interacts with the video conversion component 50, which contains a video transcoding component 51, a video processing component 52, and a native fallback component 52.

H. Alternative Embodiments of Invention

A first alternative variation of the invention splits the video transcoding and processing application between a client part running on the end user computing device 10 and a Cloud or server part, which runs on a central computing infrastructure, such as for instance server computer 20 or any other central computing resource, such as an external video transcoding or processing Cloud service like AMAZON ELASTIC TRANSCODER, MICROSOFT AZURE MEDIA SERVICES or others. Splitting the transcoding and processing application may take technical characteristics of the end user computing device 10 into account (such as computational performance of the central processing unit 12 and graphics processing unit 13, the bandwidth of the end user computing device 10 and the central computing resource that runs the other part of the video transcoding and processing application, battery charging status of an end user computing device that is a mobile device such as a smartphone, tablet computer, or laptop and other technical criteria), where different subsets of components (such as user interface component 40 and video conversion component 50), sub-components (such as input interface component 41, status interface component 42, output interface component 43, video transcoding component 51, video processing component 52, and native fallback component 53) and other software artefacts of different granularity of the video transcoding and processing application may be running on the end user computing device 10 and the central computing infrastructure, respectively.

In another variation of the invention, a video transcoding and processing task may be split between a plurality of end user computing devices 10, such as for instance the end user computing devices 10 that are connected to the same local area network or the end user computing devices 10 that simultaneously consume a World Wide Web service, such as retrieving the World Wide Web site from server computer 20 that contains the video transcoding and processing application. In this variation of the invention, the plurality of end user computing devices 10 may use a peer-to-peer computer network (such as for instance W3C WEBRTC DATA CHANNELS, BITTORRENT, etc.) to coordinate the video transcoding and processing task by exchanging status information, sharing intermediate results, etc.

Orthogonal to the aforementioned variations of the invention, a video transcoding and processing application may also be shared and distributed between the end user computing device 10 and a central computing infrastructure, other end user computing devices 10, or both, by partitioning the input data using different partitioning methods. For instance, a plurality of input video files may be partitioned by assigning different input video files from the plurality of all input video files to different end user computing devices 10 or central computing infrastructure. A more fine-granular partitioning method may assign different video, audio, or subtitle streams that are extracted from the plurality of input video files to different end user computing devices 10 or the central computing infrastructure. In an even more fine-granular partitioning method, input video files may be split on different timely offsets of the contained video, audio, or subtitle streams, such that each end user computing device 10 or the central computing infrastructure gets to transcode or process a timely segment of one or a plurality of video, audio, or subtitle streams.

Further video transcoding and processing task distribution methods may mix a data partitioning approach and a code splitting approach, where different groups of computing resources (end user computing devices 10 and/or a central computing infrastructure) run different portions of the program code of the video transcoding and processing application and also transcode or process different partitions of the plurality of input video files.

Figure 2A:
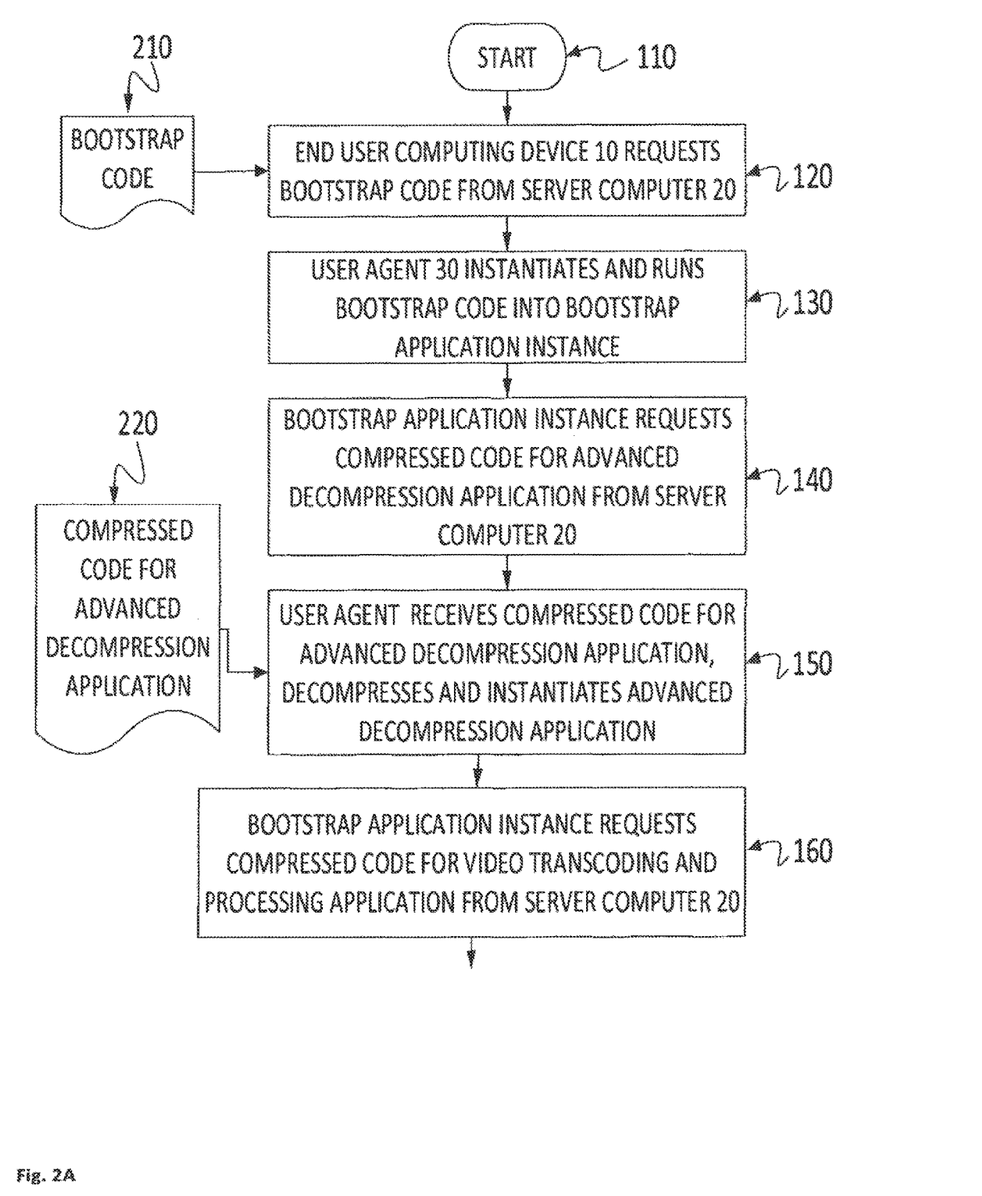
FIG. 2A and FIG. 2B combined show a flowchart illustrating a sub-operation of the present invention.
Figure 2B:
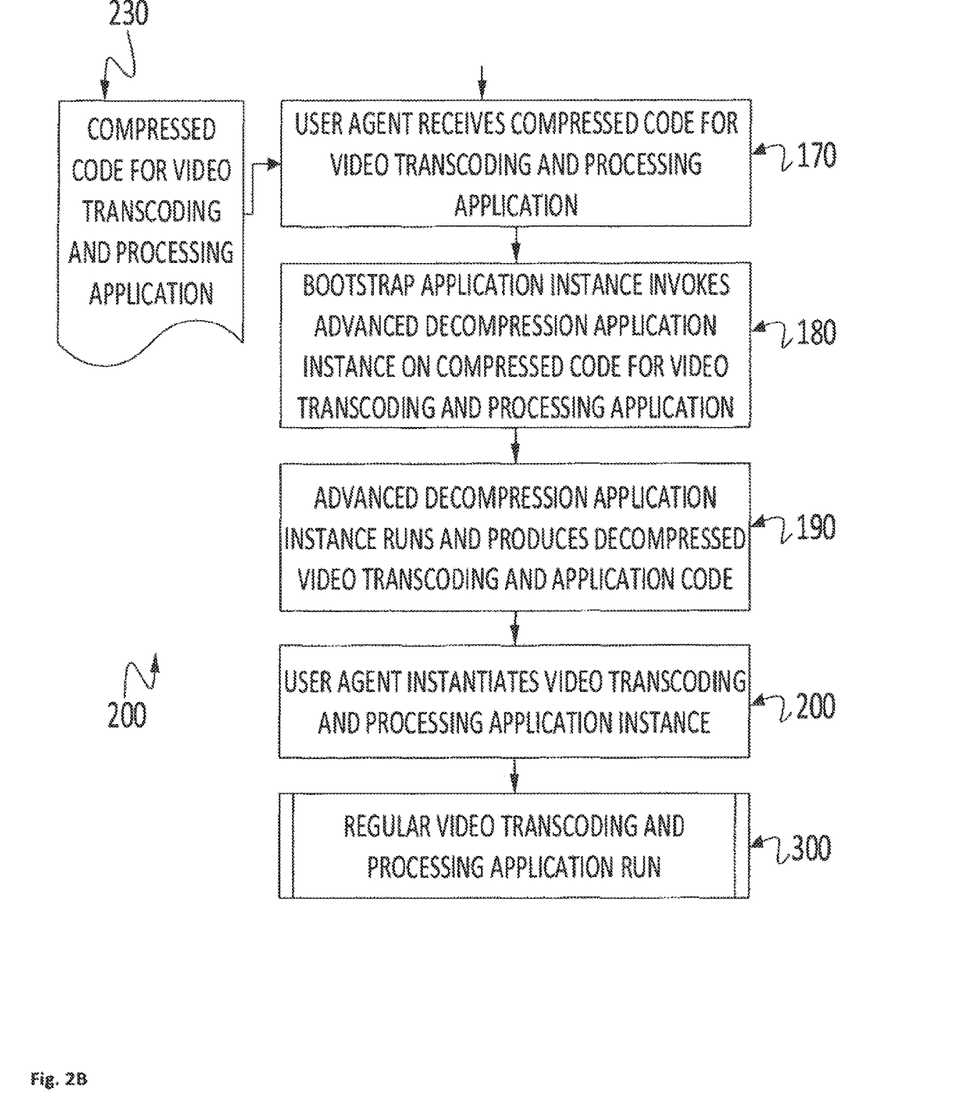

A further variation of the invention is given in FIG. 2A and FIG. 2B, which depict 1 flowchart and address the problem where the end user computing device 10 has to retrieve the video transcoding and processing application code from the server computer 20 whenever the video transcoding and processing application code is not available in the application cache 15. The video transcoding and processing application code can be spread over a plurality of large files that must be transferred over a network, such as the Internet, causing cost and delays before the video transcoding and processing application can start. The flow chart 200 depicted across FIG. 2A and FIG. 2B illustrates a process where the invention may use a very efficient advanced compression algorithm, such as the BURROWS-WHEELER (BZIP2) algorithm, the LEMPEL-ZIV-MARKOV CHAIN (LZMA) algorithm, the PAQ algorithms or other compression algorithms to reduce the size of the video transcoding and processing application code that needs to be transferred from the server computer 20 to the end user computing device 10 over a network. Some user agents 30, such as World Wide Web browsers, may already support a limited number of compression algorithms, such as GNU PROJECT's GZIP. However, the aforementioned advanced compression algorithms often accomplish far better compression ratios, which is the fraction of the original file size after compressing a file, such as the video transcoding and processing application code. In order to benefit from the better compression ratios, the flow chart in FIG. 2A and FIG. 2B illustrates the procedures performed by the end user computing device. Starting in step 110, in step 120 the end user computing device 10 requests a small bootstrap code 210 from the server computer 210. In step 130, the user agent 30 instantiates the bootstrap code 210 into a bootstrap application instance, which is then started. In step 140, the bootstrap application instance requests the standard-compressed code of the decompression application code of an advanced compression algorithm from server computer 20. In step 150, the standard-compressed advanced decompression application code 220 is received, decompressed using the built-in standard decompression routines of user agent 30 and instantiated in an advanced decompression application instance. In step 160, the bootstrap application instance requests the advanced-compressed code for the video transcoding and processing application 230 from server computer 20. In step 170, the user agent 30 receives the advanced-compressed code for the video transcoding and processing application 230. In step 180, the bootstrap application instance invokes the advanced decompression application instance and passes in the advanced-compressed code for the video transcoding and processing application 230. In step 190, the advanced decompression application instance decompresses the advanced-compressed code for the video transcoding and processing application 230. In step 200, the resulting decompressed video transcoding and application code is instantiated into the video transcoding and processing application instance. Step 300 represents the sub-process where the video transcoding and processing application is run.

Figure 3:
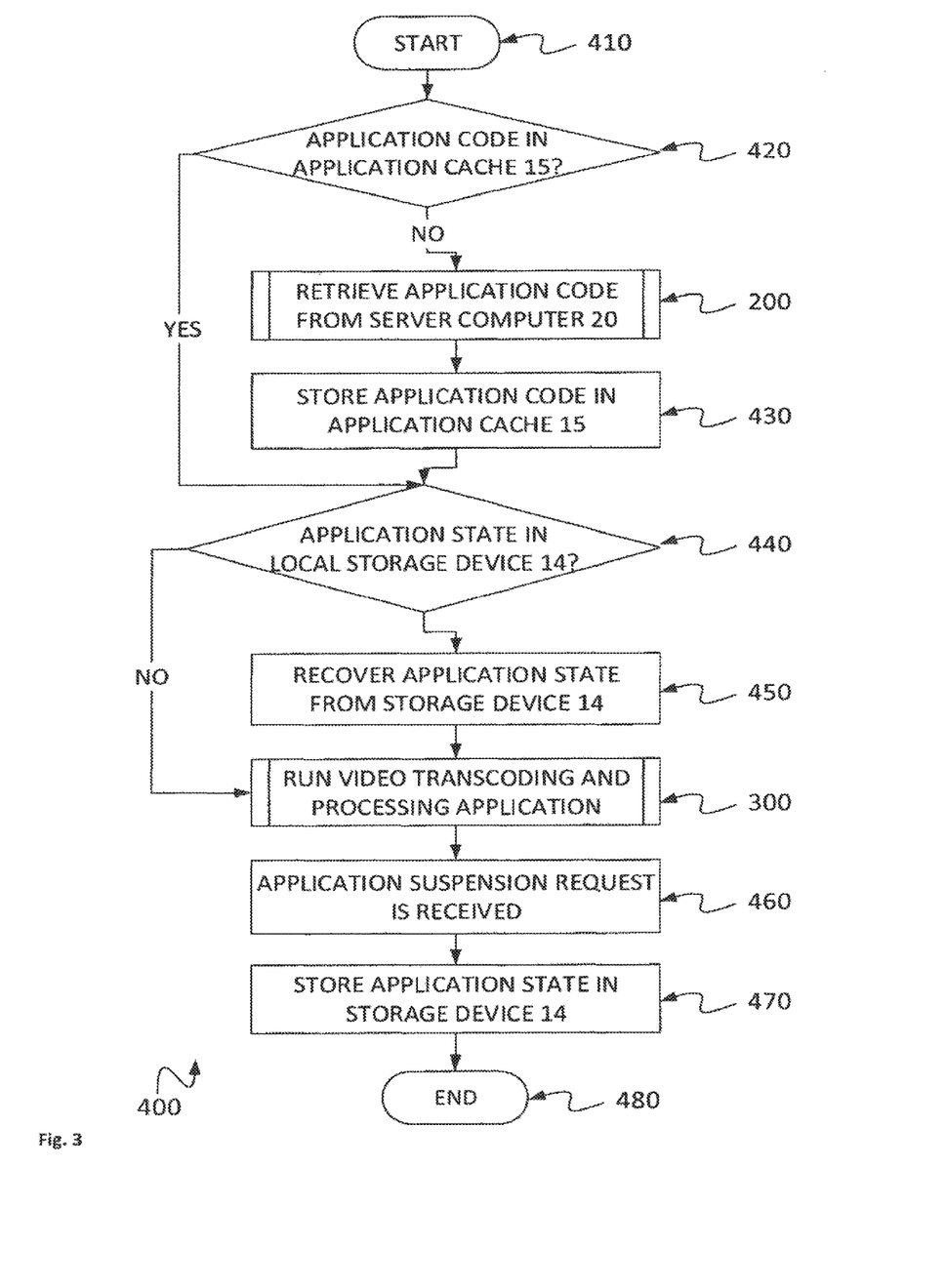
FIG. 3 is a flowchart illustrating a sub-operation of the present invention.

A further variation of the invention is given in FIG. 3, showing a flow chart 400, which depicts the process performed by the user agent 30 before the video transcoding and processing application is run and when the video transcoding and processing application ends. After starting in step 410, step 420 looks up the application cache 15 for containing the video transcoding and processing application code. If the application cache 15 does not contain the video transcoding and processing application code, sub-process 200 retrieves and instantiates the video transcoding and processing application code, such as by performing the steps described in flow chart 200. Subsequently, step 430 stores the retrieved video transcoding and application code in the application cache 15. If the video transcoding and processing application code was already contained in the application cache 15, steps 200 and 430 are skipped and step 440 is directly invoked, where the local storage device 14 (which may be local storage hardware, such as a hard disk drive, a solid state drive and others, that is accessed through from within the user agent 30 through a suitable API, such as the W3C INDEXED DATABASE API) is looked up for any state of a previous video transcoding and processing application instance, such as completely transcoded or processed videos, intermediate results of running video transcoding and processing tasks, etc. If a state from a previous video transcoding and processing application is present, step 450 recovers the state from the local storage device 14 and passes it to the previously instantiated video transcoding processing application instance, which is initialized with that state and resumes its operations from where a previous video transcoding and processing application instance stopped. If no application state is contained in the local storage device 14, step 450 is skipped and the sub-process 300 is invoked, which represents one or a plurality of video transcoding and processing application runs. In step 460, a request to suspend and terminate the running video transcoding and processing application instance is received. Such a suspension request may be triggered by the user of the end user computing device 10, by a technical failure (such as a power outage), a planned downtime and shut-off of the end user computing device 10 or any of its components, such as the user agent 30 or any other event suitable to cause a suspension and subsequent termination of a running video processing and transcoding application instance. In step 460, the current application state of the video transcoding and processing application instance is stored on the local storage device 14 and in step 480 the video transcoding and processing application instance is terminated.

In another variant of the invention, the end user computing device 10 may receive one or a plurality of input video files from another end user computing device, through a computer network, such as a peer-to-peer connection by W3C WEBRTC DATA CHANNELS. For example, the other end user computing device may be equipped with or connected to peripherals such as a digital camera and microphone, where the video and audio streams produced by these peripherals are forwarded to the local end user computing device 10 and passed to the video transcoding and processing application running in the user agent 30.

I. Operation of Preferred Embodiment

The proposed invention describes a video transcoding and processing application, running on a suitable end user computing device 10, such as a mobile device (smartphone, tablet computer, laptop computer, wearable computing device, etc.) or a stationary client device (e. g. a personal computer, workstation, server computer, etc.). The proposed invention constitutes progression of traditional Cloud computing (which is based on the client-server paradigm) and evolves it into a deployment model where a central server computer 20 (such as a server computer running in a Cloud data center) deploys code of a complex, computationally intensive and data intense application like video transcoding and processing to a plurality of end user computing devices 10, running a user agent 30, which may be a standard software platform, such as a World Wide Web browser.

Different from client-server based Cloud computing, the proposed invention runs the computationally or data intense application (such as a video transcoding and processing application) locally on the end user computing device, within the runtime environment provided by the user agent 30, such as a JAVASCRIPT, GOOGLE NATIVE CLIENT (NACL) or PORTABLE NATIVE CLIENT (PNACL), ORACLE JAVA, ADOBE FLASH, MICROSOFT SILVERLIGHT, MICROSOFT ACTIVEX, GOOGLE DART application container or plugin of a World Wide Web browser. The computationally and data intense application may further retrieve input data, such as a plurality of input video files from the local end user computing device 10 or another local device that is connected to the end user computing device 10, such as a digital camera, microphone, smartphone, UNIVERSAL SERIAL BUS (USB) stick etc. The other external device may be connected to the end user computing device 10 using a wireless or wired connection and communication protocol, such as BLUETOOTH, WIFI network, etc.

The local end user computing device 10 may further temporarily or permanently cache application code that is received from the server computer 20 in an application cache 15, subsequently avoiding to retrieve the application code from the server computer 20.

The end user computing device 10 may further use multiple central processing units 12 or multiple central processing unit cores to locally parallelize the processing of the computationally and data intense application, such as a video transcoding and processing application, where appropriate application programming interfaces of the user agent 30, such as the W3C WORKER API are used to distribute portions of the application workload (such as one or a plurality of input video files that are being transcoded or processed) across multiple central processing units 12 or central processing unit cores present in the end user computing device.

Upon completion of the computationally and data intense application instance, the output data may be stored locally in a local storage device 14, or passed to an external computing resource, such as server computer 20 or a third-party service, such as a Cloud storage service like AMAZON S3, DROPBOX, MICROSOFT ONEDRIVE, GOOGLE DRIVE, etc., a video sharing service, such as YOUTUBE, VIMEO, etc., a social network service, such as FACEBOOK, GOOGLE PLUS, TWITTER, etc.

The computationally and data intense application code may be cross-compiled from existing third-party and open-source software using suitable cross-compilation tools such as MOZILLA EMSCRIPTEN, GOOGLE WEB TOOLKIT, GOOGLE NATIVE CLIENT SDK, etc.

The proposed invention may further bundle complex parameterization settings for the computationally and data intense application code into default parameterization presets, where the user of an end user computing device can choose a complex parameterization by selecting one out of a plurality of presets. For instance, a video transcoding and processing application may use parameterization presets to determine the characteristics of an output video, such as the container format, video and audio codecs, resolution, bitrate, aspect ratio, etc.

The status interface component 42, which is a sub-component of the user-interface component 40 of a video transcoding and processing application may further present information such as textual, vocal, or visual advertisements to the user of an end user computing device while a video transcoding or processing task is running.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The invention claimed is:

1. A method for transcoding files, comprising:
    retrieving, via a runtime environment of a browser of computing device and from a remote server, a processing application comprising a video transcoding conversion component and a user interface component;
    instantiating and executing the processing application in an application container of the runtime environment of the browser;
    receiving, via the user interface component, a video or audio file; and
    transcoding, via the video transcoding conversion component executed in the application container of the runtime environment of the browser, the video or audio file from a source format to a target format.

2. The method of claim 1, wherein the video conversion component comprises a native fallback component.

3. The method of claim 2, further comprising:
    determining, via the native fallback component, native video or audio capabilities of the computing device; and
    transcoding video or audio from the video or audio file via one or both of the native video or audio capabilities and the video transcoding conversion component based on the suitability of the native video or audio capabilities to handling the video or audio file.

4. The method of claim 1, wherein the target format includes one of more of the following:
    a container format;
    a video resolution;
    a video and audio bitrate; and
    a video aspect ratio.

5. The method of claim 1, wherein video or audio is transcoded via native video or audio transcoding capabilities of the computing device, respectively, if the native video or audio transcoding capabilities are sufficient to transcode the video or audio.

6. The method of claim 1, wherein one or more subcomponents of the video conversion component are configured to transcode video or audio based on native video or audio decoding capabilities of the computing device, respectively.

7. The method of claim 3, wherein determining native video or audio capabilities of the computing device includes one or more of the following:
    determining performance characteristics of the computing device;
    determining an availability of a graphics processing unit (GPU);
    determining a number of central processing units (CPUs) on the computing device;
    determining a number of CPU cores on the computing device;
    determining a network bandwidth;
    determining an availability of an external streaming server that can deliver partially or fully transcoded video or audio data; and
    determining one or more application programmable interfaces (APIs) of the computing device or the runtime environment.

8. The method of claim 1, wherein the user interface component comprises a user interaction component and the method further comprises:
    receiving, via the user interaction component, one or more user interactions or automated control requests; and
    controlling one or more of the components of the processing application based on the user interactions or automated control requests.

9. The method of claim 6 comprising:
    displaying, via the user interface component, one or more graphical user interfaces (GUIs) to receive the one or more user interactions.

10. The method of claim 1, wherein the user interface component includes one or more of the following:
    a means to input one or a plurality of input video or audio files;
    a means to input video transcoding and processing parameters;
    a status interface component for reporting status information; and
    an output interface component.

11. The method of claim 10, wherein the output interface component comprises one or more of the following operations:
    sharing the video or audio file;
    playing the video or audio file; and
    storing the video or audio file.

12. The method of claim 1 comprising retrieving parameterization settings as a bundle of default parameterization presets.

13. The method of claim 1, wherein the runtime environment is:
    a World Wide Web browser with a JavaScript runtime environment.

14. The method of claim 1, wherein the processing application components comprise one or more of the following:
    hypertext markup language code;
    JavaScript code; and
    cascading style sheet code.

15. The method of claim 1 comprising caching application code in an application cache.

16. The method of claim 12, wherein the parameterization presets comprise configuration data for configuring the transcoding of the video or audio file.

17. The method of claim 12, wherein the processing application selects a parameterization preset to determine the target format of the video or audio file.

18. The method of claim 1, further comprising:
    producing, via the computing device, a summary video or audio file of the video or audio file.

19. The method of claim 1, wherein the processing application is removed from the computing device.

20. The method of claim 1, wherein the processing application is further configured to transmit the transcoded video file from the computing device to an external computing resource.

21. A method for transcoding files, comprising:
    retrieving, via a runtime environment of a browser of computing device and from a remote server, a processing application comprising a video transcoding conversion component and a user interface component, the video transcoding conversion component comprising a video transcoding component and a native fallback component;

instantiating and executing the processing application in an application container of the runtime environment of the browser;

receiving, via the user interface component, a video or audio file;

determining, via the native fallback component, performance characteristics of the computing device;

selecting, conditional upon the determined performance characteristics of the computing device, the video transcoding component or the native fallback component to perform transcoding; and transcoding, via the video transcoding component executing in the application container of the runtime environment of the browser, or the native fallback component, the video or audio file from a source format to a target format.

* * * * *